United States Patent [19]

Evans et al.

[11] 3,918,310

[45] Nov. 11, 1975

[54] CAPACITIVE SENSING SYSTEM

[75] Inventors: John L. Evans, Oakland; Lincoln S. Ferriss, Madison; Jay Hoffmann, Livingston, all of N.J.

[73] Assignee: The Singer Company, Little Falls, N.J.

[22] Filed: June 14, 1974

[21] Appl. No.: 479,465

[52] U.S. Cl............................. 74/5.6 D; 308/10
[51] Int. Cl.²........................................ G01C 19/28
[58] Field of Search............. 74/5.6 R, 5.6 D, 5.7; 308/10

[56] References Cited
UNITED STATES PATENTS

| | | | |
|---|---|---|---|
| 2,976,736 | 3/1961 | Cook | 74/5.6 D |
| 3,334,949 | 8/1967 | Atkinson | 308/10 |
| 3,399,002 | 8/1967 | Atkinson | 308/10 |
| 3,439,546 | 4/1969 | Baker et al. | 74/5.6 D |
| 3,482,455 | 12/1969 | Boltinghouse | 74/5.6 D |
| 3,619,014 | 11/1971 | Quick | 308/10 |
| 3,697,143 | 10/1972 | Klinchuch | 308/10 |

*Primary Examiner*—Charles J. Myhre
*Assistant Examiner*—William C. Anderson
*Attorney, Agent, or Firm*—T. W. Kennedy

[57] ABSTRACT

The angular deviation of relative alignment of a gyroscope rotor and stator about one or more axes is measured by a capacitance pickoff system. At least two pairs of separate capacitor plates are associated with the stator and positioned with respect to a portion of the rotor such that the latter forms the other plate of each capacitor. The capacitances of each pair are summed and the sum of one pair is then subtracted from the sum of the other pair. The values of the respective capacitors change with variations in relative angular alignments of rotor and stator which varies the effective overlap area of the capacitor plates. Positioning of the plates is such that when there is no angular deviation (i.e., rotor and stator axes are aligned) a null condition exists and the effective difference between opposed pairs of capacitors is zero. An additional capacitor is used to couple a drive signal from a sine wave oscillator to the rotor.

6 Claims, 7 Drawing Figures

CAPACITIVE SENSING SYSTEM

BACKGROUND OF THE INVENTION

The present invention relates to displacement measuring devices, and, more particularly, to capacitive means for measuring angular deviation of stator and rotor alignment during operation of a free gyroscope.

The use of gyroscopes as directional guidance instruments in missiles, projectiles and other moving bodies requires extremely sensitive devices for sensing angular differences in alignment of the axes of the gyro rotor and stator. In one common gyro configuration, a rotor in the form of a hollow sphere, or portion thereof, is spun about an axis while supported by suitable antifriction means with respect to a stator structure. The rotor spin axis may be aligned, for example, with the desired direction of travel of the moving body. The rotor tends to maintain its spatial orientation through physical principles of gyroscopic action, while the stator is fixed with respect to the moving body, and thus reflects any deviations in the angular orientation thereof from that originally established with respect to the rotor An arrangement of this nature is described in U.S. Pat. No. 3,824,865.

In order to provide signals of proper magnitude and direction for operating servo systems which control the path of the moving body, means are provided for developing such signals as a function of relative axial alignments of stator and rotor. Special requirements are placed on the sensing, or pick-off, devices which develop such signals due to the high acceleration forces to which the gyro is subjected, extreme accuracy and speed of processing the signals, etc. Pick-off systems used in the past have included mechanical, electrical, and electro optical sensing devices with transducer means, where required, for developing the drive signal applied to the servo system.

Among the electrical pick-off systems are those employing capacitance bridge circuits. Although acceptable for some applications, these circuits are linear over only a narrow range around a nominal value. As a result, either the capacitance plates were made much larger than the maximum range of the instrument required, or non-linear behavior was tolerated.

A principal object of the present invention is to provide an improved capacitance pick-off system for measuring the displacement of various devices, such as the rotor of a free gyroscope. A further object is to provide an electrical pick-off system having a substantially linear output over a wide range about a nominal value.

Another object is to provide a sensing system based on capacitance variation for developing signals commensurate with angular relationships of gyro stator and rotor axes having improved noise rejection and stray capacity charge rejection.

A still further object is to provide a gyroscope pick-off system utilizing non-contacting, variable capacity sensing elements which are simple, rugged, and inexpensive and may utilize existing components which do not require sophisticated fabrication techniques.

Other objects will in part be obvious and will in part appear hereinafter.

SUMMARY OF THE INVENTION

In accordance with the foregoing objectives, the invention utilizes a plurality of separate plates, each fixed with respect to one another and to one of the relatively movable surfaces of the gyro rotor and stator. The other relatively movable surface is spaced from each of the plates and forms the second plate of individual capacitors, the first plates of which are provided by the individual, fixed plates. The capacitors are electrically connected in pairs, the capacitors of each pair constituting those plates arranged diametrically opposite one another with respect to the other movable member.

A minimum of two pairs of capacitors are provided for each axis about which relative displacement of the two members is to be measured. The capacitance sum of one pair is subtracted from the sum of the other pair and the effective difference between opposed pairs is zero at the null position of the two relatively movable members. Any angular deviation of the stator axis from the spatially fixed rotor axis causes an unbalance in the value of the capacitors in the plane of the angular deviation, the value on one side becoming larger and that on the other side smaller.

A sine wave generator is coupled through a drive capacitor to the movable element forming the common plate of each of the individual capacitors thus providing electrical excitation as a means of effectively determining relative capacitance values. The signal from this generator is also used to demodulate the signal representing the effective difference between the opposed pairs of individual capacitors. Thus, the system provides an error signal having an amplitude proportional to the angular deviation of the rotor from a null position, and a polarity indicative of the direction of the angular deviation.

The invention is disclosed in the context of a free gyroscope having a spin-stabilized rotor. In one disclosed embodiment the rotor is spherical with a discontinuity at the equator, adjacent which the fixed plates are positioned. In another embodiment the rotor is hemispherical and has an inertia rim adjacent the fixed plates. In each case, the gyro stator, or structure fixed with respect thereto, supports the fixed plates of the pick-off system. The electronic components used in conjunction with the pick-offs, and also carried within the gyro, is preferably all solid state, occupies a small volume, is light in weight, and economical in power consumption. Its function is non-critical, reliable and resistant to the effects of extremes in environment over long periods.

DETAILED DESCRIPTION

Figure 1:
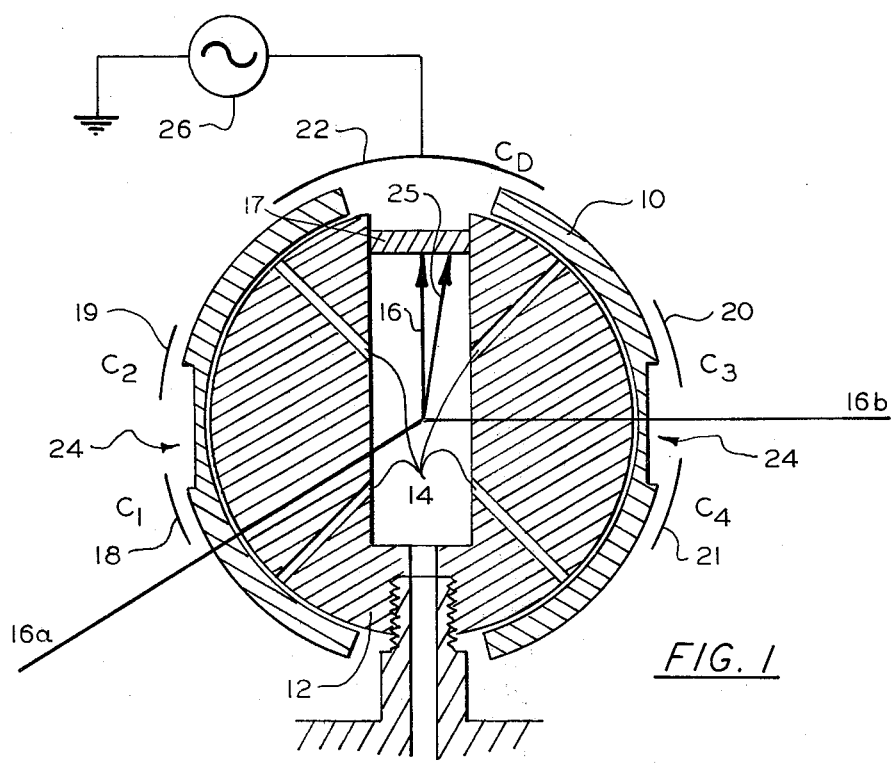
FIG. 1 is a somewhat diagrammatic illustration of a first embodiment of structure embodying the invention.

Referring now to FIG. 1, reference numeral 10 denotes a hollow, spherical shell of electrically conducting material, open at the top and bottom for fabrication and assembly purposes, constituting the rotor of a gyroscope. Rotor 10 is internally supported by stator structure 12, having a plurality of ports 14 communicating with a source of pressurized gas (not shown) to maintain a relatively small, fixed gap between the stator and rotor. The gas is brought in through central opening 13 in the stator and its supporting pedestal 15 to provide anti-friction bearing means, allowing rotation of the rotor about spin reference axis 16, and mutually perpendicular output reference axes 16a and 16b. Any of a number of well-known means may be used to effect spin-up of rotor 10 at the desired time.

The opening at the upper end of stator 12 is sealed by closure element 17 to provide an airtight chamber. Also, the means providing and maintaining gas pressure for support of rotor 10, as well as other constructional details of the gyroscope structure, are well known in the art and need not be repeated in detail herein since they form no part of the present invention.

A plurality of arcuate plates 18–22 are fixedly supported with respect to stator structure 12 externally of rotor 10. A discontinuity, denoted generally by reference numeral 24, extends around the equator of rotor 10. When the elements are in an assumed null position, the spin axis of rotor 10 is aligned with the axis of stator 12 relative to which angular deviations are to be measured. In this position, plates 19 and 20 are supported with half of their height adjacent the surface or rotor 10 above discontinuity 24, and the other half adjacent the discontinuity. Likewise, plates 18 and 21 are supported with half of their height adjacent the surface of rotor 10 below discontinuity 24, and the other half adjacent the discontinuity. Plate 22 is supported with its entire surface adjacent an opposing portion of rotor 10. Each of plates 18–21 extend for slightly less than 90 around the rotor, plates 18 and 19 diametrically opposing plates 20 and 21, respectively. Plate 22 is connected to an oscillator, schematically indicated at 26, as discussed more fully later herein.

Each of plates 18–22 form one plate of a capacitor, the other plate of which is formed by rotor 10. The capacitors formed by the rotor and plates 18–21 are denoted $C_1$–$C_4$, respectively, and that formed by the rotor and plate 22 is denoted $C_D$, indicating that this is a drive capacitor, coupling the rotor, and thereby the other capacitors, to oscillator 26. It may be seen from FIG. 1 that rotation of rotor 10 relative to stator structure 12 in a clockwise direction from the position shown, about axis 16a (normal to the plane of the drawing) will increase the opposing surface areas of rotor 10 and plates 18 and 20, while decreasing the opposing surface areas or the rotor and plates 19 and 21. This condition occurs, for example, when the spin axis of the rotor is moved to the position indicated by line 25, relative to the stator axis. Relative movement resulting in the rotor spin axis moving counterclockwise with respect to the stator axis results in an increase in opposing surface area of plates 19 and 21 with rotor 10, and a decrease in opposing area of the rotor and plates 18 and 20. An additional set of four plates (not shown) may be positioned at 90 around the periphery of rotor 10 to plates 18–21 to sense relative rotation about axis 16b.

Figure 2:
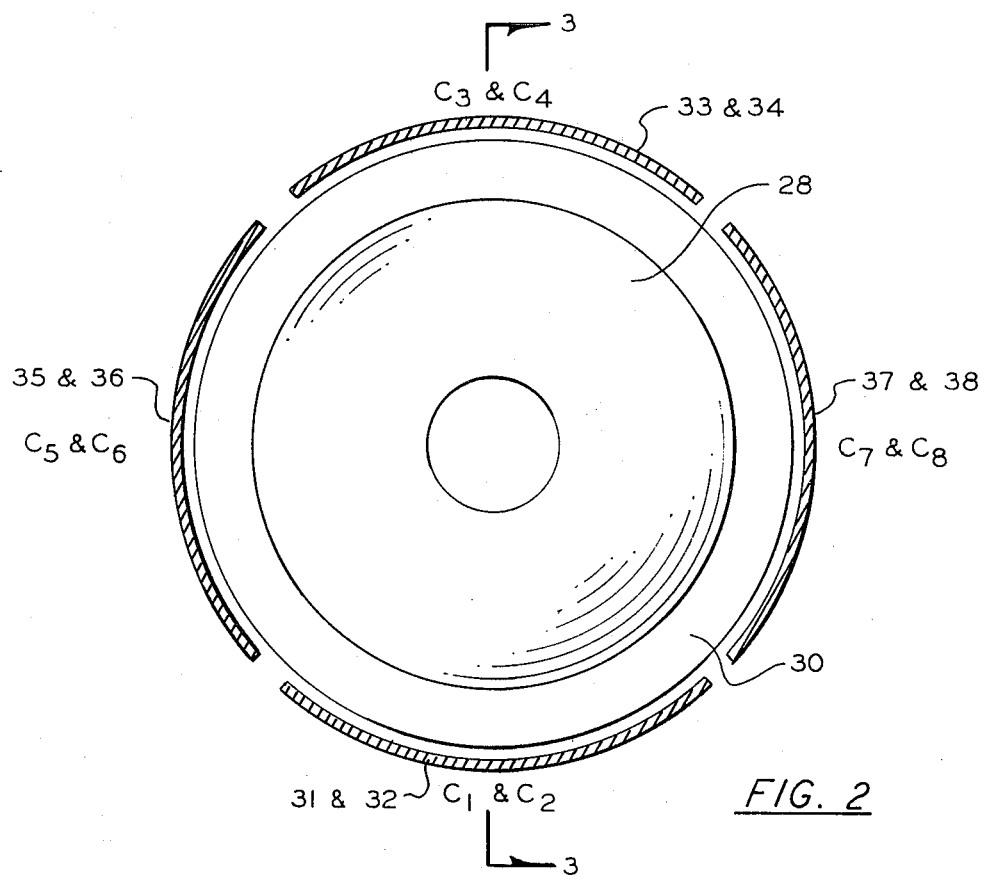
FIG. 2 is a somewhat diagrammatic, plan view of a second embodiment of structure embodying the invention.
Figure 3:
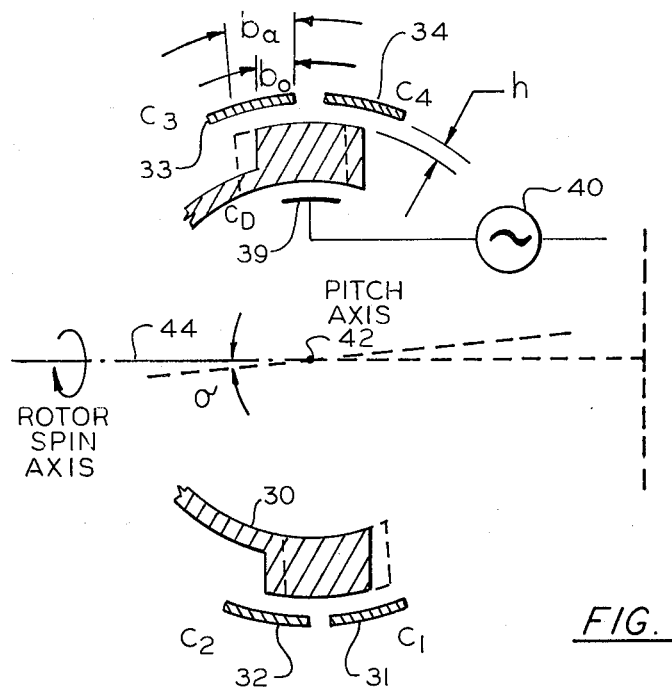
FIG. 3 is a fragmentary, sectional view of the structure of FIG. 2 taken on the line 3—3 thereof.

Turning now to FIGS. 2 and 3, an embodiment of the pick-off system as employed in a gyro having hemispherical rotor 28 is shown. Inertia rim 30 is attached to rotor 28 for rotation therewith, the rotor being supported, uncaged and spun-up, for example, in the manner described in the earlier referenced U.S. Pat. No. 3,824,865. Also see co-pending U.S. application Ser. No. 412,711 filed Nov. 5, 1973 and assigned to the same assignee as the present invention.

A total of nine arcuate plates 31–39 are positioned adjacent rim 30 or rotor 28. Each plate is affixed to stationary supports within the instrument casing, eight of the plates (31–38) being arranged in four pairs concentrically with the outside of rim 30, and plate 39 similarly arranged adjacent the inside of the rotor rim. FIGS. 2 and 3 clearly illustrate the positioning of each arcuate plate with respect to the rotor, it being understood, of course, that each of plates 31–39 forms one plate of a capacitor and that the rotor rim itself forms the other plate of each capacitor. The notations $C_1$–$C_8$ denote the capacitors forms by plates 31–38, respectively, with rim 30, and the notation $C_D$ indicates the capacitor formed by plate 39 and rim 30.

Capacitor $C_D$ is used to couple a signal from 20 KHz sine wave oscillator 40 to the rotor. The frequency of excitation could be in the range of from several kilohertz to several megahertz; the value of 20 KHz is used merely as a typical, illustrative example. Capacitors $C_1$–$C_4$ are used for sensing relative rotation about the pitch axis, indicated by dot 42 in FIG. 3. Capacitors $C_5$–$C_8$ sense relative rotation about the yaw axis in the same manner. The same notations are used for the capacitors in FIGS. 2n and 3 as in FIG. 1 since the positioning and function of plates 31–34 and 39 with respect to rim 30 are the same as that of plates 18–22 with respect to rotor 10. From the showing of FIGS. 2 and 3 it will be easily understood how two additional pairs of capacitors are used to sense relative rotation about a perpendicular axis.

When rotor spin axis 44 is aligned with the stator axis, rim 30 will be centered with respect to all fixed plates adjacent thereto and the effective value of all of capacitors $C_1$–$C_8$ is zero, and the effective difference between opposed pairs of capacitors is zero; i.e., at null $(C_1 + C_3) - (C_2 + C_4)$ is zero. Any angular deviation of the stator axis alignment from the spatially fixed rotor axis causes an unbalance in the value of the capacitors in the plane of the angular deviation, the value on one side getting larger and that on the other side getting smaller. The system senses the amplitude of the physical angular deviation by comparing the amplitude of the a.c. electrical signal coupled through the individual capacitors around the rotor rim.

A fragment of the rotor is shown in FIG. 3, together with the fixed plates of capacitors $C_1$–$C_4$. Rotor rim 30 is shown in solid lines in the position it occupies when rotor spin axis 44 is aligned with the stator axis. In this position, the effective overlap area of each of the fixed plates is equal with respect to rim 30 and each plate is spaced therefrom by distance h, whereby the value of all capacitors is equal. When the stator rotates about pitch axis 42 through angle a, the relative position of the rotor rim and capacitor plates is as indicated in dotted lines. The difference in effective overlap area with respect to capacitor $C_3$ is indicated by $b_o$ and $b_a$ for axis displacements of 0° and a°, respectively. The value of capacitors $C_1$ and $C_3$ will increase, and the value of capacitors $C_2$ and $C_4$ will decrease due to the change in effective overlap area, the difference in value being a function of angular displacement. By summing capacitors $C_1$ and $C_3$, and capacitors $C_2$ and $C_4$, changes in capacity due to run-out and axial motion of the rotor tend to cancel out. The sum of the pair capacities remains the same since the values of opposing capacitors of each pair change in opposite directions.

Any of the capacitances can be described approximately by the equation:

$$C = \frac{KE_o W r \ominus}{h} \quad (1)$$

Where
- $K$ = dielectric constant of the medium between capacitor electrodes
- $E_o$ = Permittivity of free space
- $W$ = The depth of the capacitance plate into the plane of the figure
- $r$ = The radius of the rotor
- $h$ = The gap between the plates and the rotor
- $\ominus$ = Angular overlap of opposing plates The fact that there also exists capacitance between the plate and that portion of the rotor it subtends over discontinuity 24 in the FIG. 1 embodiment will be discussed later. The four capacities for sensing displacement about a given axis can be written:

$$C_1 = CO \left(1 + \frac{rd\ominus}{1} + \frac{dh\,1}{h}\right)$$
$$C_2 = CO \left(1 - \frac{rd\ominus}{1} + \frac{dh\,2}{h}\right)$$
$$C_3 = CO \left(1 + \frac{rd\ominus}{1} - \frac{dh\,1}{h}\right) \quad (2)$$
$$C_4 = CO \left(1 - \frac{rd\ominus}{1} - \frac{dh\,2}{h}\right)$$

Where
- $CO$ = The nominal null value of each capacitor
- $d\ominus$ = Angular deviation from null
- $dh1$ = A change in gap at C1 and C3 produced by an acceleration load on the rotor. (Axial motion).
- $dh2$ = A similar gap change observed at C2 and C4.

It is seen that if capacitances $C_1$ and $C_3$ are added in parallel, and also $C_2$ and $C_4$, by means of operational amplifiers having fixed capacitors $C_F$ connected between input and output, the outputs of the operational amplifiers are voltages proportional to the ratios $$\frac{C1 + C3}{CF} \text{ and } \frac{C2 + C4}{CF}.$$

If these voltages are fed into a differential amplifier, a voltage may be formed proportional to:

$$\frac{(C1 + C3)}{CF} - \frac{(C2 + C4)}{CF} \quad (3)$$

Returning to equations (2) we see that $$\frac{(C1 + C3) - (C2 + C3)}{CF} = \frac{4Co\,rd\ominus}{CF} = K\,d\ominus \quad (4)$$

where $K$ is a constant. Thus, the output voltage of the differential amplifier is directly proportional to angular deviation from null.

The complement of electronics required to implement the pickoff mechanization for two channels of output (i.e., sensing angular deviations about two axes) are four pickoff amplifiers, two difference amplifiers, two phase-sensitive demodulators and an excitation source. The active devices would be low-cost integrated circuit amplifiers packaged with chip capacitors and thick-film resistors to produce a small, inexpensive, efficient, light weight electronics assembly.

Figure 4:
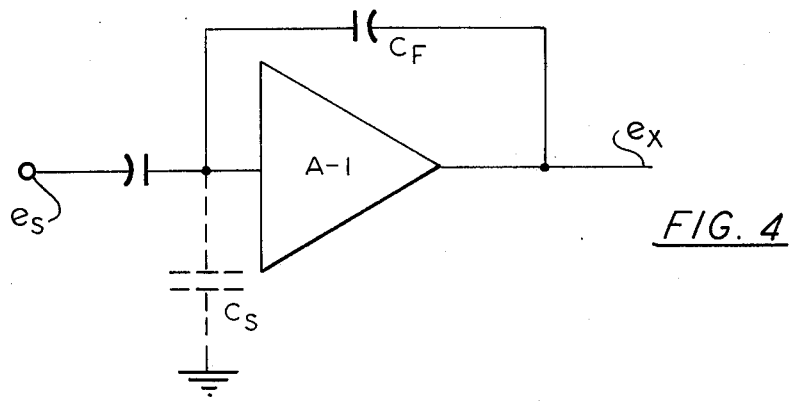
FIGS. 4 and 5 are schematic showings of the operation of elements of circuitry employed in the invention.

The operation of the pickoff amplifiers is described with reference to FIG. 4. The a-c inverting amplifier A-1 is connected with the pickoff electrode Cx connected to the input terminal and a fixed capacitor $C_F$ connected between input and output. $C_s$ represents stray and wiring capacitance which may exist at the input terminal of the amplifier. The a-c excitation appearing on the rotor by virtue of a set of excitation electrodes ($C_D$) which capacitively couple the source of excitation to the rotor is represented by the notation $e_s$. Assuming the amplifier has a high input impedance, $$e_x = e_s \frac{-AC_x}{C_x + C_s + (1+A)\,C_F}$$

For moderate gains and values of $C_x$, $C_s$ and $C_F$ within the same order of magnitude, $$\frac{e_x}{e_s} = -\frac{C_x}{C_F}$$

Since $e_s$ and $C_F$ are constant, the output voltages is proportional to the electrode-rotor capacitance $C_x$.

A valuable property of the pickoff amplifier is the insensitivity to changes in the stray capacitance, $C_s$. Differentiating the output voltage equation with respect to $C_s$ and expressing in fractional form, $$\frac{de_x}{Cx} = -\frac{Cs}{Cx + Cs + (1+A)\,Cf} \frac{dCs}{Cs}$$

For a gain of 1000, a conservative value, a 5 percent change in stray capacitance would produce an effective gain change of approximately 0.005 percent.

Figure 5:
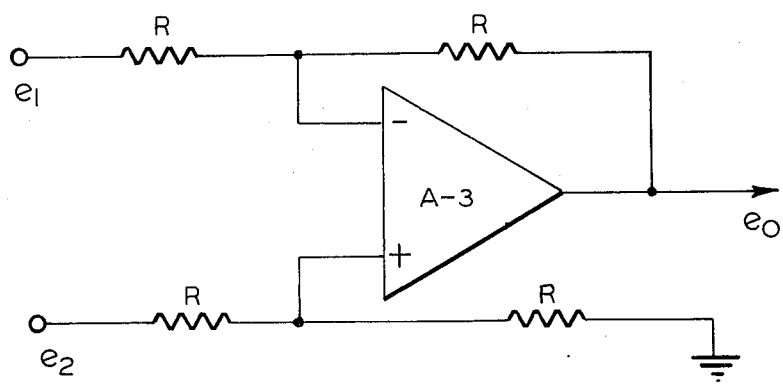

FIG. 5 is a schematic of the difference amplifier. Applying the usual operational amplifier assumptions of high gain and high input impedance, for equal value resistors R, $$e_o = e_2 - e_1$$

The output voltage $e_o$ is at the frequency of the excitation source; that is, $e_o = K\phi \sin w_c t$. Application of this signal to a phase-sensitive demodulation with ripple filter produces an output voltage proportional to gyro angular displacement in the d-c polarized form usable for control system input.

Figure 6:
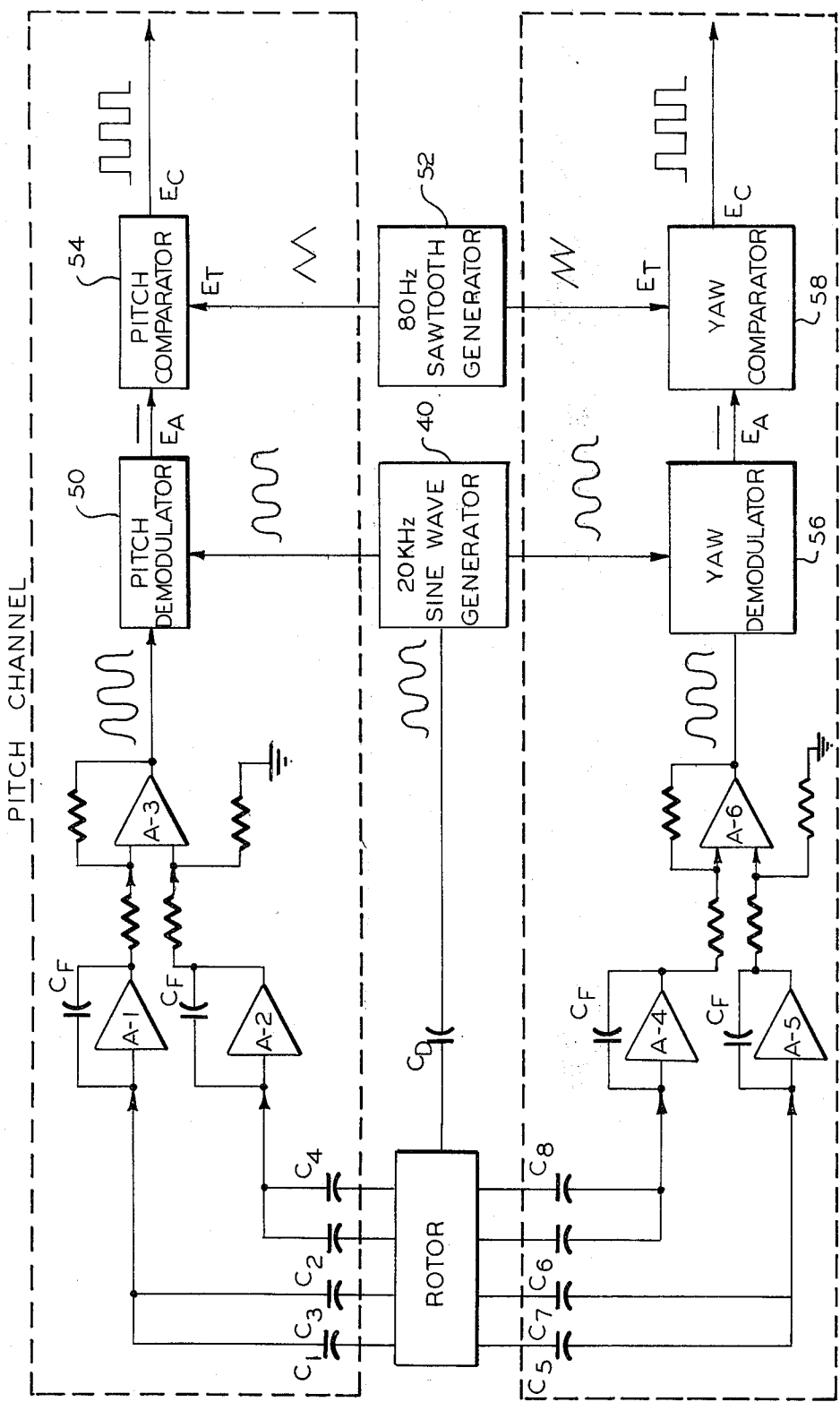
FIG. 6 is a simplified functional block diagram of the pickoff system.

FIG. 6 is a simplified, functional, block diagram of the overall pickoff assembly. Capacitors $C_1$ and $C_3$ are added in parallel, as are capacitors $C_2$ and $C_4$, by amplifiers A1 and A2, respectively, each having capacitors $C_F$ connected between the input and output sides thereof. The outputs of amplifiers A1 and A2 are fed to differential amplifier A3, having as an output a voltage proportional to $$\frac{C_1 + C_3}{C_F} - \frac{C_2 + C_4}{C_F}$$

which is equal to a constant times the angular displacement from null of the rotor spin axis and corresponding stator axis about the pitch axis. It is seen that this form of summing and differencing attenuates errors produced by displacements of the rotor and noise effects produced by runout of the rotor.

The analog angle output signal for the pitch axis from amplifier A3 is provided to pitch demodulator 50 where the analog signals (e.g., 20 KH2 frequency) are demodulated into dc outputs proportional to the pitch angle deviation. The conversion of this signal, designated $E_A$ in FIG. 6, to the PDM ($E_c$) is accomplished by comparing it with a triangular periodic reference ($E_T$) from signal generator 52, having a typical frequency, for example, of 80 Hz for a PDM escapement or actuator control system. At the output of comparator 54 the 80 Hz signal (Ec) is a logic 1 when $E_A$ is greater than $E_T$, and a logic 0 when $E_A$ is less than $E_T$. The pulse width is thereby proportional to the amplitude of the analog signal, a function of the physical deviation of the axes, and cycling at an 80 Hz rate.

The PDM output is derived electrically from an analog output rather than directly from the rotor because it is simpler and less expensive to generate a stable, precise 80 Hz signal electrically than to keep the rotor spinning at a rate with high enough precision and stability to permit generation of the PDM directly.

Demodulator 56 and comparator 58 receive signals from oscillator 40 and signal generator 52, respectively, to provide the yaw PDM in a manner identical to that just described for the pitch axis. Implementation of the system by selection of proper components, design of the power supply circuit, etc., is well within the purview of those skilled in the art, whereby it is unnecessary to discuss the construction and operation of angle pickoff and electronics processing beyond the simplified diagram of FIG. 6.

These pickoffs may operate, for example, with a 0.005 inch gap. Normal machining tolerances on the rotor surfaces are in the order of 0.002 inches or 40 percent of the gap. However, referring again to equations (2) and (3), it is seen that if all the capacitors experience a change in gap in the same direction simultaneously, as would occur in an eliptically distorted rotor, the effect of the change is surpressed. Runout produced by having the center of rotation off the center of the rotor geometry is also suppressed.

The only time noise can come through these pickoffs as a result of geometrical defects is when there exists a difference between dC1 + dC3 and dC2 + dC4. If the two sums are equal and opposite, or if the elements of the two sums are equal and opposite, the noise is suppressed. Therefore, it is assumed that this pickoff can be made with a signal to noise level in the order of or greater than 100 and with a linearity in the order of 3 percent of full scale. It may be remarked that in the event of an angular displacement, dC1 + dC3 is necessarily different from dC2 + dC4 since this is the basis of the pickoff output. Therefore, the noise is increased. But the signal is also greater and therefore the signal-to-noise ratio tends to remain constant.

Figure 7:
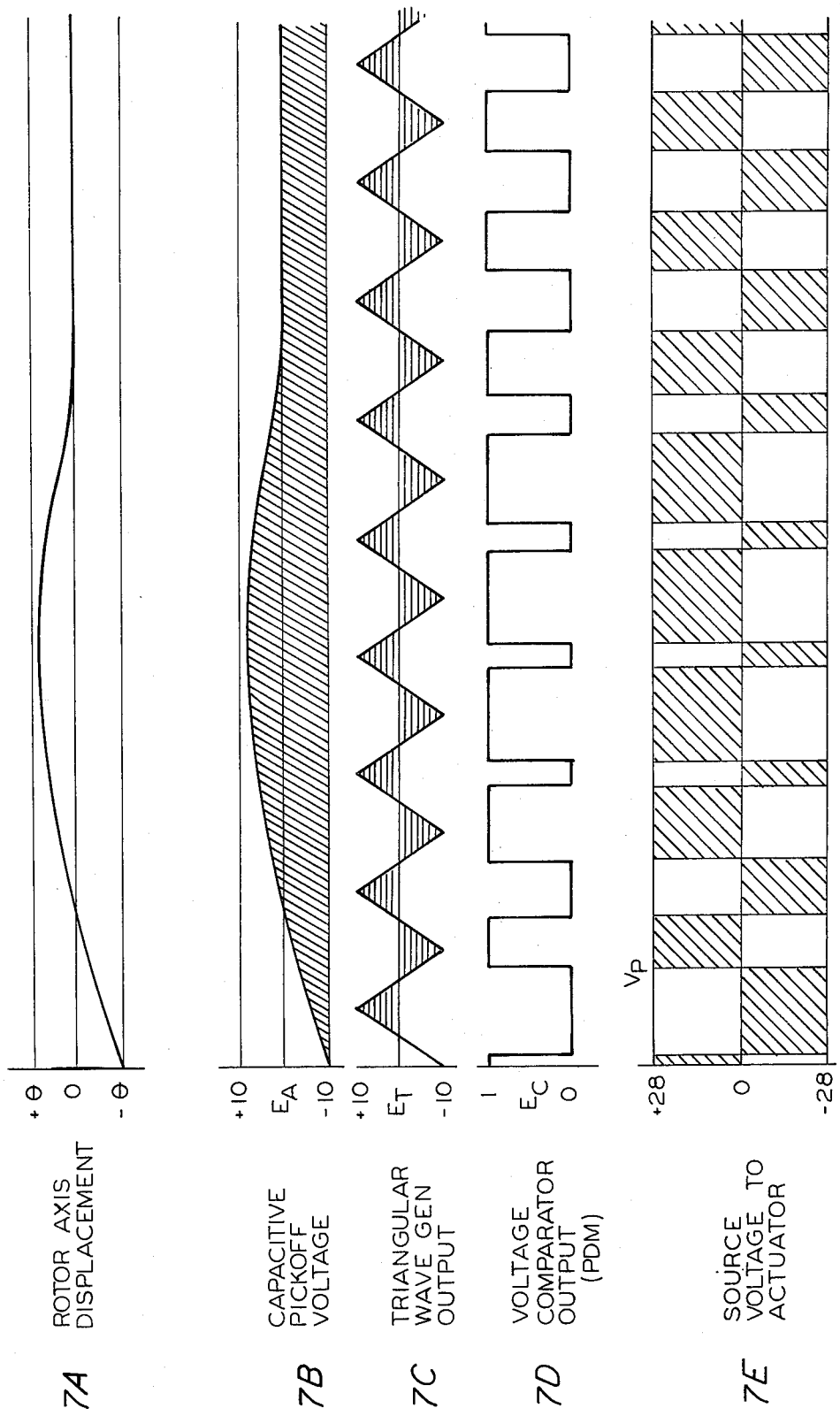
FIG. 7 is a series of waveform diagrams indicating how the error output signals of the pickoff system are converted to the required actuator signals.

The waveforms of FIG. 7 indicate how the analog error output signals are converted to the required PDM actuator signals. They illustrate the generation of the PDM signal for a hypothetical vehicle angular transient condition along one axis. Initially, $E_A$, less than null value, is effective in producing a PDM signal nearly 1.0 value. Overshoot produced by system response to initial conditions yields a PDM signal approach +1 several periods later. Finally, a steady state equilibrium PDM signal = 0 is achieved as the axis reaches null. The waveforms are:

Line 7A—Physical Angular Deviation (in one plane) of the vehicle longitudinal axis from the rotor axis.

Line 7B—Electrical Signal generated by means of the capacitive pickoffs after demodulator ($E_A$).

Line 7C—Triangular Reference Signal cycling at 80 Hz.

Line 7D—Control of Comparator with inputs consisting of signals depicted in Lines 2 and 3. The width of the pulses is proportional to the amplitude of the analog signal and the pulse train is single ended in nature.

Line 7E—Source voltage to actuator. The single ended comparator output signal is converted to polarized signals at voltage levels required for actuating the vehicle controls. For zero angular deviation, the pulsewidth of the opposite polarity waveforms are equal and would result in the controls remaining fixed.

What is claimed is:

1. A gyroscope construction comprising
a. a stator;
b. a rotor supported for rotation about an axis with respect to said stator;
c. at least two pairs of electrically conducting plates and fixedly positioned with respect to said stator and each having a continuous face, a portion of which is spaced a predetermined distance from and concentric with an electrically conducting portion of said rotor, said plates and said conducting portion forming individual capacitors having a capacitance variable in accordance with the area of said face which is spaced said predetermined distance from said conducting portion of said rotor;
d. a first of said two pairs of plates being positioned on diametrically opposite sides of said rotor and so positioned with respect to said conducting portion that relative angular displacement of said stator and rotor in a first direction about an axis perpendicular to said rotational axis increases said face area of both plates of said first pair by an equal amount, and relative angular displacement about said perpendicular axis in a second direction decreases said face area of both plates of said first pair by an equal amount;
e. a second of said two pairs of plates being positioned on the same opposite sides of said rotor as respective plates of said first pair and so positioned with respect to said conducting portion that relative angular displacement of said stator and rotor about said perpendicular axis in said first direction decreases said face area of both plates of said second pair by an equal amount, and relative annular displacement about said perpendicular axis in said second direction increases said face area of both plates of said second pair by an equal amount;
f. first and second operational amplifiers respectively connected to said first and second pairs of plates to add in parallel the individual capacitance of each pair formed thereby;
g. a differential amplifier connected to both of said operational amplifiers to subtract the output of one from the other;
h. an additional plate having a continuous face concentric with and spaced a predetermined distance from an electrically conduction portion of said rotor;
i. an oscillator connected to said additional plate thereby coupling the oscillator's signals to each of said individual capacitors whereby the signal output of said differential amplifier will be commensurate with the amount of said relative annular displacement.

2. The invention according to claim 1 and further including a phase-sensitive demodulator connected to receive inputs from both said oscillator and said differential amplifier.

3. The invention according to claim 2 and further including a wave generator operating at a constant, predetermined frequency, and a comparator connected to receive inputs from both said demodulator and said wave generator, and having a digital output of a first value when the demodulator signal is greater than the wave generator signal, and a second value when said demodulator signal is less than said wave generator signal.

4. The invention according to claim 1 wherein said rotor includes an inertia rim which comprises said electrically conducting portion.

5. The invention according to claim 1 wherein said rotor is essentially spherical and includes a peripheral discontinuity adjacent the position of each of said plates and so positioned with respect thereto that said portion of each of said continuous faces is spaced said predetermined distance from said conducting portion at the juncture thereof with said discontinuity, the remainder of said continuous faces being opposite said discontinuity.

6. The invention according to claim 1 and further including third and fourth pairs of electrically conducting plates arranged with respect to one another and to said rotor the same as said first and second pairs, the centers of said third and fourth pairs being arranged at 90 intervals from the centers of said first and second pairs in a plane normal to said axis of rotation, whereby the individual capacitors formed by said third and fourth plates and said conducting portion of said rotor increase and decrease in value in response to relative angular displacement of said rotor and stator about a third axis perpendicular to both said rotational axis and said perpendicular axis.

* * * * *